Dec. 20, 1966 H. ZAHN 3,292,989
APPARATUS FOR INTERMITTENT FILM TRANSPORT
Filed Oct. 24, 1963 3 Sheets-Sheet 1

Jnventor:
Heinrich Zahn
by Michael S. Striker
Atty

APPARATUS FOR INTERMITTENT FILM TRANSPORT

Filed Oct. 24, 1963 3 Sheets-Sheet 2

Jnventor:
Heinrich Zahn
by Michael J. Striker
Atty

Dec. 20, 1966 H. ZAHN 3,292,989

APPARATUS FOR INTERMITTENT FILM TRANSPORT

Filed Oct. 24, 1963 3 Sheets-Sheet 3

Jnventor:
Heinrich Zahn
by Michael S. Striker
Atty

United States Patent Office 3,292,989

Patented Dec. 20, 1966

3,292,989

APPARATUS FOR INTERMITTENT FILM TRANSPORT

Heinrich Zahn, Rossdorf, near Darmstadt, Germany, assignor to Fernseh G.m.b.H., Darmstadt, Germany Filed Oct. 24, 1963, Ser. No. 318,763
Claims priority, application Germany, Oct. 24, 1962, F 38,118
9 Claims. (Cl. 352—29)

Figure 2:
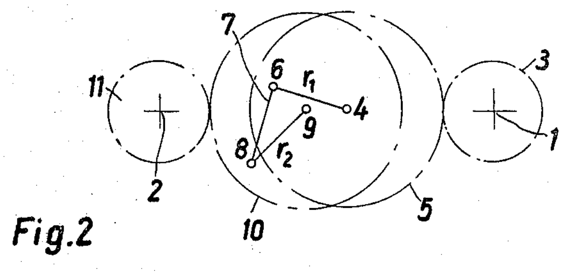

Kinematographic films are usually taken at a speed of 24 frames per second. But television pictures are transmitted in some countries with 60 frames per second. If in these countries conventional films are to be transmitted by television, generally the first film frame is scanned twice, the second one three times, the third one twice, etc.

Numerous proposals have been made for putting this method into practice. It has already been possible to obtain five staggered pictures by means of a fivefold prismatic optical system and to convert them one after the other into electric signals by means of a so-called dissector tube. In another apparatus the film frame is reproduced by very short light pulses on the photosensitive coatings of electronic storage tubes, in which the television image is scanned electronically in a known manner. In the apparatus available up to now for film scanning it is impossible to obtain television pictures of particularly high quality.

It is the object of the invention to provide an apparatus for transmitting television pictures with 60 frames per second of outstanding high quality from a film advanced by 24 frames per second.

It is a further object of this invention to provide an arrangement of the type mentioned which is comparatively simple in its structure and reliable in operation.

According to the invention the component effecting the film transport, for example a claw, is driven by a double crank arranged between two pairs of transformation gears of the transformation ratio $u{:}1$ and $1/u{:}1$ respectively. The distance between the bearings of the two cranks and the phase relation of the driven shaft is chosen such that the driven shaft is turned by an angle of 180 degrees, when the driving shaft is alternately turned by an angle of $$180\ddot{u}\frac{m}{n} \text{ degrees and } 180\ddot{u}\frac{n-m}{n} \text{ degrees respectively}$$

In this case $m$ and $n$ are integers, each different from 1, and the factors $\ddot{u}$ and $1/\ddot{u}$ respectively signify the transformation ratio of the two pairs of gears. When selecting the numbers $m$ and $n$ appropriately, in each case the desired scanning rhythm may be obtained. In countries where the scanning rate is 60 frames per second, as, for example, in the United States of America, $m$ and $n$ should be selected such that during the slow motion phase the angle of rotation of the driving shaft is 50 percent greater than during the rapid motion phase.

In general the factor $\ddot{u}$ should be equal to the number of fields of which a complete television image is composed.

The apparatus according to the invention makes it possible to obtain 60 frames per second in a so-called flying spot scanner, in which the film is intermittently moved by a frame length 24 times per second for example by means of the mechanism for the rapid pulldown of films described in the British Patent No. 863,082.

Thereby it is made possible to enjoy the advantages offered by the flying spot scanning method such as high degree sharpness, good contrast, absence of noise signals without any disadvantages or loss of quality caused by periodically changing the optical path in the conventional flying spot scanners.

In a preferred embodiment the feed sprocket, the claw and the drive of the clamping cheeks, which clamp the film periodically, are operated by the driven shaft of the crank gear, whereas the take-up sprocket arranged before the sound head is driven at constant speed. In this way a constant speed of the film between take-up sprocket and sound head is achieved, so that the film, which passes intermittently the picture gate, passes the sound head at uniform speed.

In a preferred embodiment of the invention the picture gate which secures the film periodically, is opened at the same angular speed as well during the slow motion phase as during the rapid motion phase of the crank gear. Thereby the clamping gate is opened for equal time intervals during both motion phases of the crank gear, that is during the whole film transport action. Therefore, also during the rapid motion phase the film cannot be jammed during the periods, when it is to be transported through the clamping gate. So when the film passes a video scanner without sound head, for example, when a film is transmitted and the accompanying sound is taken from a separate magnetic tape, it is in general advisable to operate the take-up sprocket also by the driven shaft of the crank gear, that is at periodically varying speed.

The invention will now be described with reference to the accompanying drawings which are examples of embodiments of the invention. All parts which are not necessary for understanding the invention have been omitted for sake of simplicity and for giving a better view of the main parts. Corresponding parts have the same reference symbols in all drawings.

In the drawings

Figure 1:
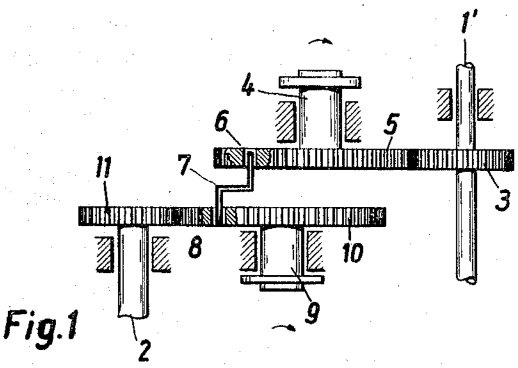
Figure 3:
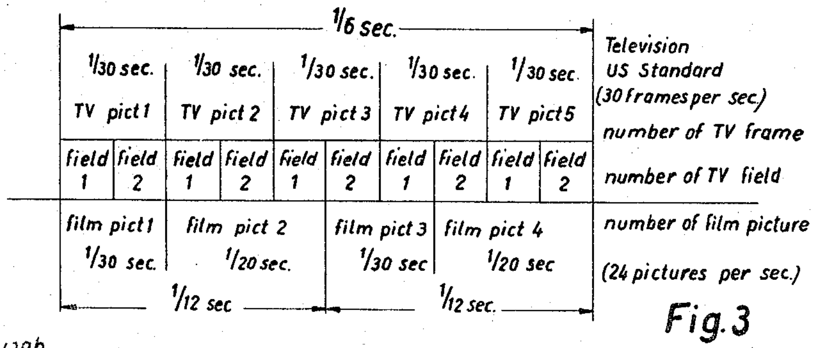
Figure 4:
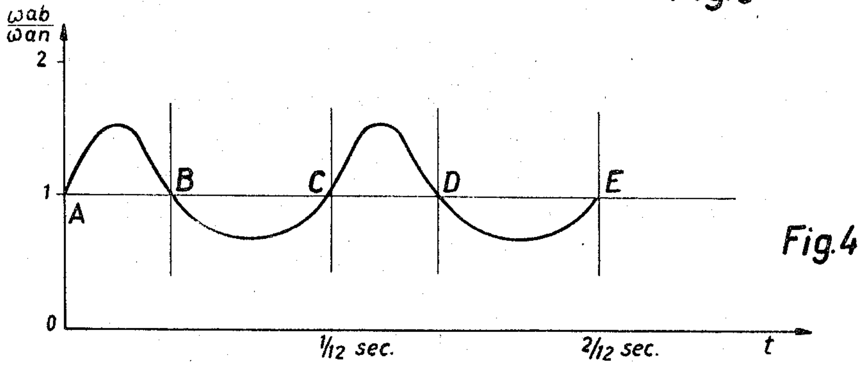
Figure 5:
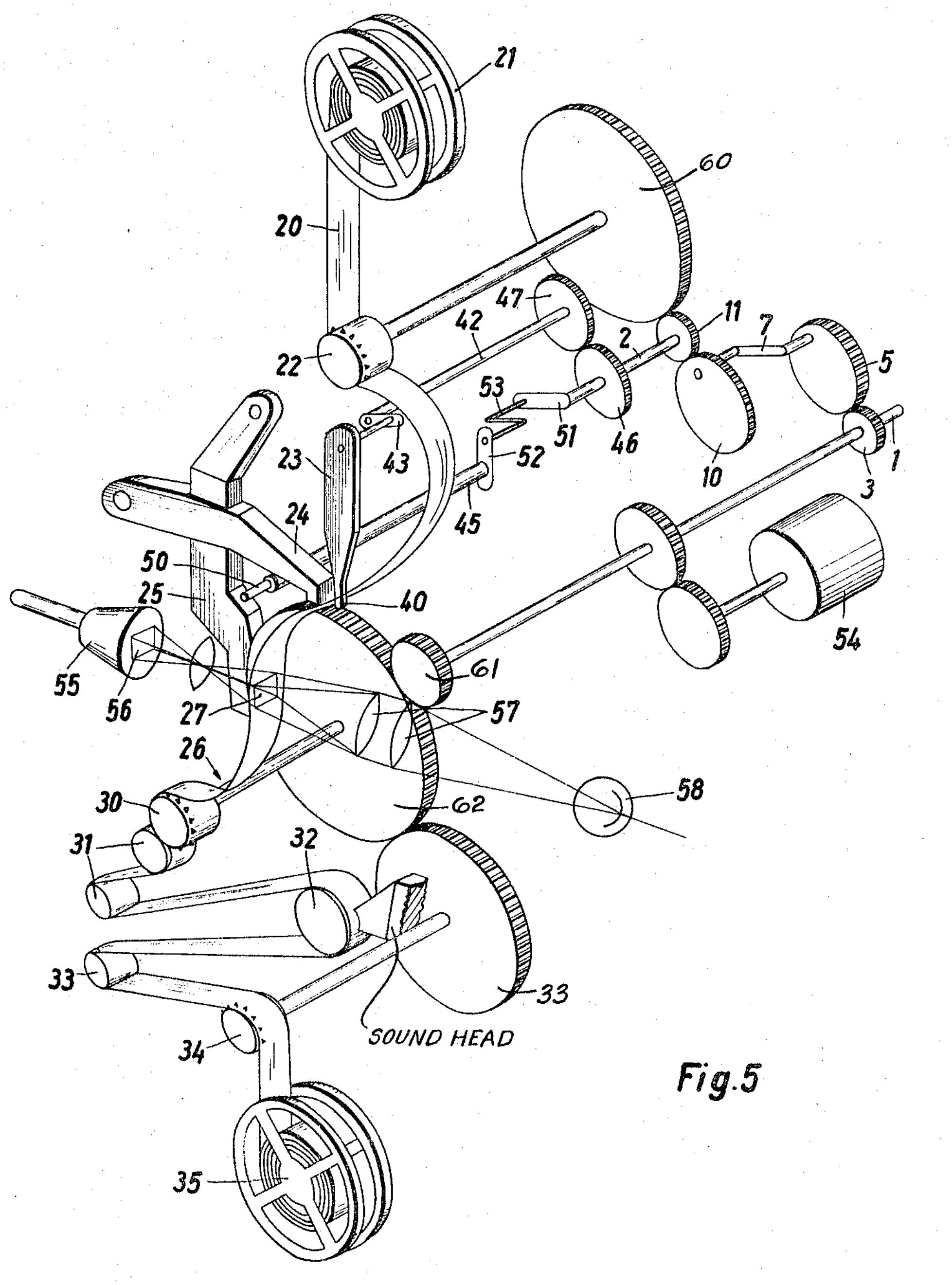
Figure 6:
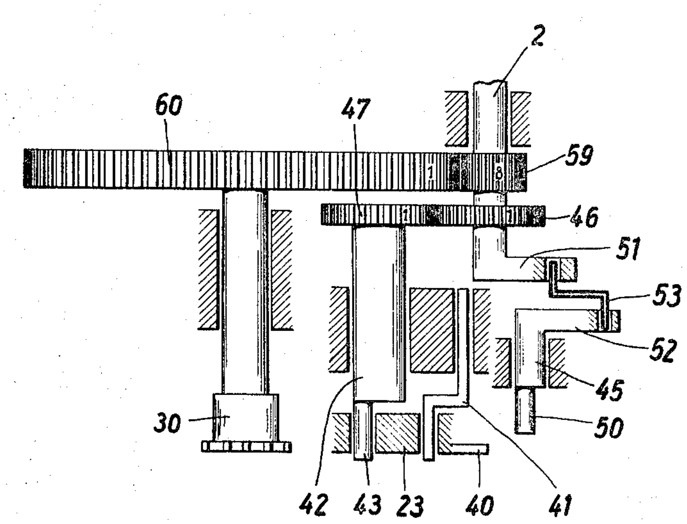

FIG. 1 is a horizontal section of the drive mechanism in an apparatus according to the invention, FIG. 2 is a schematic vertical projection of the same drive mechanism, FIG. 3 is an operation scheme, FIG. 4 is a diagram, showing the ratio of the angular speed of the driven shaft and the angular speed of the driving shaft as a function of time, FIG. 5 is a perspective view on the main parts of the driving system of a flying spot scanner according to the invention with intermittent film movement during the vertical flyback periods, FIG. 6 is a sectional view of details of another embodiment of the invention.

FIG. 1 is the gear, in which a periodically varying angular speed of driven shaft 2 is derived from the uniform angular speed of driving shaft 1. On the driving shaft there is a front wheel 3 which drives the bigger front wheel 5 fixed on shaft 4. In the toothed wheel 5 there is at 6 one bearing for crank 7; the second bearing is at 8 in a toothed wheel 10 which is fixed on shaft 9. The toothed wheel 10 drives by means of the toothed wheel 11 the driven shaft 2. The transformation ratio of the toothed wheels 3 and 5 is 2:1, so that during one rotation of the driving shaft there is only half a rotation of the toothed wheel 5. The toothed wheel 10 drives the toothed wheel 11 with a transformation ratio of 1:2, so that the rates of rotations of shaft 1 and shaft 2 are equal. But owing to the different angular speeds of the toothed wheels 5 and 10 resulting from the lateral displacement of the shafts 4 and 9 and the crank 7 between them, during one phase the driven shaft 2 is turned by an angle of 360 degrees, when the driving shaft is turned by an angle of 288 degrees. During the following slow phase of the double crank comprising parts 5, 7 and 10 the driving shaft is turned by an angle of 432 degrees, whereas the driven shaft 2 is again turned by an angle of 360 degrees. The shaft 1 via gears 61 and 62 drives at constant angular speed the sprocket 30 ahead of and, via gears 61, 62 and 63 the drum 34, subsequent to the sound head.

FIG. 2 illustrates the function of crank 7 which couples the toothed wheels 5 and 10. For better clarity, the radii $r_1$ and $r_2$ are shown which are effective between each bearing 6 and 8 respectively and the axis of the corresponding toothed wheel.

FIG. 3 is an operation scheme which illustrates, how thirty pictures or frames respectively per second according to the American television standards may be obtained from a film running at a speed of 24 frames per second. The top line shows five successive television images (the chronological sequence should be read from left to right); according to the American television standards the duration of each of these images is 1/30 second. The entire period comprises a duration of five times 1/30 second, that is 1/6 second. The second line shows the numbers of the frames. Fields containing the lines with odd numbers are designated by 1 and fields containing the lines with even numbers by 2. The bottom line indicates the succession of film pictures, from which the television frames are obtained. It can be clearly recognized that the second and the fourth film picture has to remain longer (by 50 percent) within the picture gate than the first and the third film frame respectively; this is achieved by the toothed wheel crank gear shown in FIGS. 1 and 2.

In FIG. 4 the ratio of the angular speed $\omega_{ab}$ of the driven shaft 2 and the angular speed $\omega_{an}$ of the driving shaft 1, given by curve 14, is plotted against the time $t$. The diagram refers to the period of 1/6 second schematically shown in FIG. 3. At the points A, B, C, D and E the film is intermittently advanced by a frame length. It can be seen from FIG. 4 that at the points A, B, C, D and E the angular speed of the driven shaft is equal to the angular speed of the driving shaft. This has proved particularly favourable with regard to a long working life of the apparatus and to a smooth operation of the film transport mechanism.

FIG. 5 shows the main parts of the driving system of a film scanner according to the invention. From the storage drum 21 the film is advanced by means of sprocket 22 into the range of the claw 23. This claw works together with the clamping cheek 24 and the clamping gate 25 and the difference in air pressure (indicated by arrow 26) applied to the concave side of the film below the clamping gate, and transports the film intermittently through film gate 27. Sprocket 30 feeds the film at uniform speed via guide pulleys 31 to the rotating flywheel 32 of the sound head (not shown), then via another guide pulley 33 and sprocket 34 to the take-up drum 35.

Claw 23, having an apex which engages in the perforation holes of the film, is pivoted on a crank 41 (FIG. 6) and operated by the eccentric 43 mounted on shaft 42. This shaft is driven from the shaft 2 by means of the toothed wheels 46 and 47, both having the same size. The eccentric which causes the release of clamping cheek 24 and clamping gate 25 (shown in FIG. 5) is driven by a double crank comprising the crank arms 51 and 52 which are connected with the shafts 2 and 45 respectively, and the crank connection 53 fixed in these arms.

Shaft 1 drives shaft 2 by means of the toothed wheels 5 and 11 and the crank 7 as described above with reference to FIG. 1. The beforementioned gear parts are driven by the motor 54 by means of corresponding toothed wheels and auxiliary shafts.

The principle of pneumatic film transport is described in the British Patent No. 863,082. Novel features of the apparatus according to the invention are characterized in that the film is held stationary in the picture gate during time periods of periodically varying length, so that each film picture is scanned alternately twice or three times respectively by the raster 56 produced with a predetermined constant frequency on the screen of cathode ray tube 55. So the light flux modulated by the opacity of the scanned parts of the film is led via the condenser 57 to the photocell 58 and converted there into a sequence of electric signals.

The gear described in FIGS. 1 and 5 is especially suitable for television and film scanners, in which the film, after having passed the picture gate, passes also a sound head. In many cases, however, the sound of the television program is not taken from the scanned film but from a magnetic tape; therefore, in this case, it is unnecessary that the film passes a sound head.

While in the embodiment of the invention according to FIGS. 1 and 5 the take-up sprocket 30 is driven at constant speed in order to effect a uniform speed of the film transport, it is not necessary to do this in an apparatus in which the film is not transported through a sound head after having passed the picture gate.

It may then even be advisable to drive the take-up sprocket at a non-uniform speed. For this purpose the gear described in FIG. 6 may be used. The drive is effected by the shaft rotating at non-uniform speed, e.g. the shaft 2 shown in FIG. 1 left at bottom. The toothed wheel 30, which transports a 16 mm. substandard film (not shown), is driven by the front wheels 59 and 60, which transform the number of rotations at a ratio of 1:8 to a slower speed.

While the invention has been illustrated and described as embodied in a special arrangement, it is not intended to be limited to the details shown, since various modifications and structural changes may be made without departing in any way from the spirit of the present invention.

What is claimed and desired to be secured by Letters Patent is:

1. In an apparatus for the intermittent transport of kinematographic film, in combination, rotary drive means including a rotary drive member arranged for rotation about a first axis and including speed reducing means having a transmission ratio of $u$:1 ahead of said rotary drive member; rotary driven means including a rotary driven member arranged for rotation about a second axis parallel to said first axis and spaced a predetermined distance therefrom, said rotary driven means including speed increasing means having a transmission ratio of $1/u$:1 and driven by said driven member; and double crank means constituting a drive connection between said rotary drive means and said rotary driven means, said crank means including a first leg parallel to said first axis and rotatably connected to said rotary drive member at a location spaced from said first axis by a second predetermined distance, a second leg parallel to said first leg and rotatably connected to said rotary driven member at a location spaced from said second axis by a third predetermined distance, and an intermediate portion connecting said first and second legs and maintaining the distance therebetween constant, all of said distances being chosen such that in response to rotation of said rotary drive member at a constant angular velocity said rotary driven member rotates with continuously varying angular velocity.

2. In an apparatus according to claim 1, wherein said legs and said intermediate portion of said double crank means constitute a rigid substantially Z-shaped member, said first and second legs being substantially parallel to each other and each thereof being substantially perpendicular to said intermediate portion.

3. In an apparatus according to claim 1, wherein said rotary drive member comprises a gear having said first leg of said double crank means journaled therein and said rotary driven member comprises a second gear having said second leg of said double crank means journaled therein.

4. In an apparatus according to claim 1, said apparatus having an optical axis and comprising film advancing means connected to said rotary driven means and adapted to longitudinally advance the film stepwise past said optical axis, said apparatus further comprising sound reproducing means adapted to cooperate with the film at a location beyond the optical axis in the direction of movement of the film, and constant speed film transport means arranged intermediate the optical axis and said sound reproducing means and adapted to engage the film along its path from the optical axis to the sound reproducing means whereby the film is caused to advance at a constant speed in the region of the sound reproducing means.

5. In an apparatus according to claim 1, said dimensions of said double crank means being chosen such that the angle through which said drive member rotates during one-half revolution of said driven member is 50% greater than the angle through which said drive member rotates during the next one-half revolution of said driven member, so that the time required by said driven member for the first one-half revolution thereof exceeds by 50% the time required by said driven member for said next one-half revolution thereof.

6. In an apparatus according to claim 1, further comprising film engaging means for advancing the film stepwise, said rotary driven means further comprising an additional rotary driven member located past said speed increasing means and operatively connected to said film engaging means for actuating the latter, said constant angular velocity of said rotary drive means, the integer *u*, and all of said distances of said double crank means being chosen such that during each 1/6 second the film is intermittently advanced four times remaining in position alternately 1/20 and 1/30 of a second.

7. In an apparatus according to claim 1, the dimensions of said double crank means being chosen to be such that at least once during each cycle of rotation of said rotary driven member the instantaneous angular velocity thereof is equal to the constant angular velocity of said rotary drive member.

8. In an apparatus for the intermittent transport of kinematographic film, in combination, first rotating means; rotary drive means arranged to rotate at a constant angular velocity, said rotary drive means including a rotary driven member and rotary speed reducing means rotated by said first rotary means, located ahead of said rotary drive member and having a transmission ratio of $u$:1;

second rotating means; rotary driven means including a rotary driven member and speed increasing means driving said second rotary means and having a transmission ratio of $1/u$:1 and being driven by said driven member; and variable transmission means connecting said rotary drive member and said rotary driven member with continuously varying angular velocity in response to rotation of said rotary drive member at constant angular velocity, whereby said rotary drive member and driven member rotate at a speed which is $1/u$ times the speed of said first and second rotating members, respectively.

9. In an apparatus according to claim 8, said variable transmission means including double crank means constituting a drive connection between said rotary drive member and said rotary driven member, the dimensions of said double crank means being chosen such that the angle through which said drive member rotates during one-half revolution of said driven member is 50% greater than the angle through which said drive member rotates during the next one-half revolution of said driven member, so that the time required by said driven member for the first one-half revolution thereof exceeds by 50% the time required by said driven member for said next one-half revolution thereof.

References Cited by the Examiner

UNITED STATES PATENTS

| | | | |
|---|---|---|---|
| 2,215,762 | 9/1940 | Morrison | 74—393 X |
| 2,347,325 | 4/1944 | Kirschbaum | 352—29 X |

FOREIGN PATENTS

| | | |
|---|---|---|
| 566,330 | 11/1958 | Canada. |

JULIA E. COINER, *Primary Examiner.*